United States Patent
Miller (10) Patent No.: US 10,580,128 B2
(45) Date of Patent: Mar. 3, 2020

(54) WHOLE SLIDE MULTISPECTRAL IMAGING SYSTEMS AND METHODS

(71) Applicant: Akoya Biosciences, Inc., Menlo Park, CA (US)

(72) Inventor: Peter J. Miller, Cambridge, MA (US)

(73) Assignee: Akoya Biosciences, Inc., Menlo Park, CA (US)

( * ) Notice: Subject to any disclaimer, the term of this patent is extended or adjusted under 35 U.S.C. 154(b) by 0 days.

(21) Appl. No.: 14/149,020

(22) Filed: Jan. 7, 2014

(65) Prior Publication Data

US 2014/0193061 A1    Jul. 10, 2014

Related U.S. Application Data (60) Provisional application No. 61/751,192, filed on Jan. 10, 2013.

(51) Int. Cl.
*G06T 7/00* (2017.01)
*G06T 7/32* (2017.01)

(52) U.S. Cl.
CPC .............. *G06T 7/0012* (2013.01); *G06T 7/32* (2017.01); *G06T 7/97* (2017.01); *G06T 2207/10036* (2013.01); *G06T 2207/10056* (2013.01); *G06T 2207/10064* (2013.01); *G06T 2207/20212* (2013.01)

(58) Field of Classification Search
None
See application file for complete search history.

(56) References Cited

U.S. PATENT DOCUMENTS

| 5,880,473 | A  | 3/1999  | Ginestet        |
| 6,142,629 | A  | 11/2000 | Adel et al.     |
| 7,321,791 | B2 | 1/2008  | Levenson et al. |

(Continued)

FOREIGN PATENT DOCUMENTS

| CN | 102327156     | 1/2012  | ............ A61C 19/04 |
| EP | 2 359 745     | 8/2011  | ............ A61B 5/00  |
| WO | WO 2012/149555| 11/2012 | ............ G01N 21/64 |

OTHER PUBLICATIONS

International Search Report and Written Opinion of International Application No. PCT/US2014/010475 dated Mar. 9, 2014 (13 pages).

(Continued)

*Primary Examiner* — Jiangeng Sun
(74) *Attorney, Agent, or Firm* — Fish & Richardson P.C.

(57) ABSTRACT

The methods and systems disclosed herein include obtaining a first plurality of images of a sample, where each image in the first plurality of images corresponds to a different spectral band of illumination light incident on the sample or emission light from the sample, obtaining a second plurality of images of the sample, where each image in the second plurality of images corresponds to a different spectral band of illumination light incident on the sample or emission light from the sample, aligning the first and second pluralities of images based on information from a first image from the first plurality of images and a second image from the second plurality of images, where the first and second images correspond to a shared spectral band, and combining at least some members of the first plurality of images and at least some members of the second plurality of images to form an image stack.

26 Claims, 6 Drawing Sheets

(56) References Cited

U.S. PATENT DOCUMENTS

| | | | |
|---|---|---|---|
| 7,953,264 B2 | 5/2011 | Levenson et al. | |
| 8,208,704 B2 | 6/2012 | Wong et al. | |
| 2002/0001080 A1* | 1/2002 | Miller | G01J 1/08 356/326 |
| 2005/0030315 A1 | 2/2005 | Cohen et al. | |
| 2006/0118742 A1 | 6/2006 | Levenson et al. | |
| 2006/0245631 A1 | 11/2006 | Levenson et al. | |
| 2007/0016082 A1* | 1/2007 | Levenson | A61B 5/0059 600/476 |
| 2007/0147673 A1 | 6/2007 | Crandall | |
| 2007/0153370 A1 | 7/2007 | Olszak et al. | |
| 2008/0144169 A1* | 6/2008 | Zahniser | G02B 21/086 359/385 |
| 2008/0194969 A1 | 8/2008 | Werahera et al. | |
| 2010/0086220 A1* | 4/2010 | Minear | G06T 7/0026 382/218 |
| 2010/0160791 A1 | 6/2010 | Liu et al. | |
| 2010/0189321 A1 | 7/2010 | Otsuka | |
| 2011/0117025 A1 | 5/2011 | Dacosta et al. | |
| 2011/0144462 A1 | 6/2011 | Lifsitz et al. | |
| 2011/0292343 A1 | 12/2011 | Papac et al. | |
| 2012/0085932 A1* | 4/2012 | Themelis | G01J 3/2823 250/459.1 |
| 2012/0128264 A1 | 5/2012 | Yazdanfar et al. | |
| 2012/0326055 A1 | 12/2012 | Wilson et al. | |
| 2013/0012794 A1* | 1/2013 | Zeng et al. | 600/328 |
| 2013/0038725 A1* | 2/2013 | Lanoue et al. | 348/143 |
| 2013/0041267 A1* | 2/2013 | Ntziachristos et al. | 600/476 |
| 2014/0022381 A1 | 1/2014 | Heinold | |
| 2014/0293036 A1 | 10/2014 | Ddecaux et al. | |

OTHER PUBLICATIONS

Jovanovic et al., "Autonomous and Continuous Georectification of Multi-Angle Imaging Spectro-Radiometer (MISR) Imagery", *International Archives of Photogrammetry and Remote Sensing*, vol. XXXI, Part B2, section "Band-to-band transformation"; pp. 176-181; (Jan. 1, 1996).

Levenson et al., "Spectral Imaging in Preclinical Research and Clinical Pathology", *Analytical Cellular Pathology* (Amsterdam), vol. 35, No. 5-6, Apr. 4, 2012 (Apr. 4, 2012), pp. 339-361.

Zitova et al., "Image Registration Methods: A Survey", *Image and Vision Computing*, Elsevier, Guildford, GB, vol. 21, No. 11, Oct. 1, 2003 (Oct. 1, 2003), pp. 977-1000.

International Preliminary Report on Patentability for International Application No. PCT/US2014/010483 dated Jul. 23, 2015 (11 pages).

Themelis et al., "Multispectral imaging using multiple-bandpass filters", *Optics Letters*, vol. 33, No. 9, pp. 1023-1025 (May 1, 2008).

Non-Final Office Action issued by the U.S. Patent and Trademark Office for U.S. Appl. No. 14/149,015 dated Aug. 10, 2015 (13 pages).

Office Action for Chinese Application No. 201480012433.7, dated Jun. 29, 2016.

Chinese Office Action for Chinese Application No. 201480011495.6 dated Jan. 11, 2017 (26 pages).

Communication from the European Patent Office for European Application No. 14 703 190.0 dated Dec. 8, 2016 (5 pages).

Chinese Office Action for Chinese Application No. 201480011495.6 dated Nov. 10, 2017 (7 pages).

Final Office Action for U.S. Appl. No. 14/149,015 dated May 24, 2018 (13 pages).

Summons to Attend Oral Proceedings for EPO Application Serial No. 14703190.0 dated Jun. 6, 2018.

Johns, "Notes on LEDs'", 2004 Retrieved from the internet: <URL:http://www.gizmology.net/LEDs.htm>.

Varga et al., "Automated High Throughput Whole Slide Imaging Using Area Sensors, Flash Light Illumination and Solid State Light Engine", *Perspectives on Digital Pathology: Results of the Cost Action IC0604 Euro-Telepath; In: Studies in Health Technology and Informatics*, vol. 179, pp. 187-202 (Aug. 28, 2012).

\* cited by examiner

WHOLE SLIDE MULTISPECTRAL IMAGING SYSTEMS AND METHODS

CROSS-REFERENCE TO RELATED APPLICATIONS

This application claims priority to U.S. Provisional Patent Application No. 61/751,192, filed on Jan. 10, 2013, the entire contents of which are incorporated by reference herein.

TECHNICAL FIELD

This disclosure relates to systems and method for imaging of biological samples, and more particularly, toward systems and methods for whole slide imaging of cells and tissue, and image analysis.

BACKGROUND

Whole slide imaging systems have been developed that can produce a digital image of an entire microscope slide, or portions thereof. These include microscope imaging optics and digital cameras together with mechanical apparatus to sweep out a scan of the sample, along with software to coordinate these actions and store the resulting images. Typical pathology specimens can be imaged in about 10 minutes or less, and the resulting images may have a resolution of ¼ micron or finer, corresponding to 3.6 billion pixels for a 15×15 mm sample. These systems are used in the fields of research and clinical pathology to image tissue sections, cytology samples, and other samples for which microscopic imaging is valuable.

Some of these instruments produce an image based on fluorescent light emission from the sample in response to excitation light. Fluorescence imagery is useful for samples prepared with fluorescent agents such as DAPI, the Alexa fluors, the Cy fluors, and other compounds known in the art. Some such instruments use a color digital camera, together with an epi-filter cube containing a multiband excitation filter and a multiband emission filter, to generate a 3-band image of the sample, which enables measuring up to three fluors in a given scan. The Aperio ScanScope FL (available from Aperio, Vista, Calif.) is a system of this type.

Other whole-slide scanning systems produce a fluorescence image using a monochrome digital camera, together with a similar epi-filter cube and a wavelength-selective excitation source; they illuminate the sample in a first wavelength band while a first image is acquired, then illuminate it in another band while a second image is acquired, and so on. In this way, three or even four bands can be imaged, the limit being imposed by available optical filters for excitation and emission filtration. The 3DHistech P250 (available from 3DHistech, Budapest, Hungary) is an example of this kind of scanner.

Yet other fluorescence scanners use a monochrome digital camera, and engage a series of different epi-filter cubes, taking an image with each filter cube. Since each filter cube can have its own distinct excitation and emission filter, these are not limited to three or four bands. The Leica SCN400F (available from Leica Biosystems, Richmond, Ill.) is an example of a system of this kind.

Multispectral imaging systems exist that can measure more than 4 bands in a fluorescence image of a sample. The Vectra imaging system (available from PerkinElmer, Waltham, Mass.) is an example of such a system. It uses a liquid crystal tunable filter to select individual wavelengths within the visible range, under computer control, while taking images with a monochrome digital camera. The data thus acquired is termed an image cube, and it contains a spectrum at each of many spatial locations in an image. It is possible to unmix the spectrum at each point into its various component signals, using a spectral library of known spectra for the components that are present in the sample. Nuance software (available from PerkinElmer, Waltham, Mass.) can produce such spectral libraries and use them to unmix image cubes into component images.

Biological samples generally emit some fluorescent light in response to an excitation light beam, even if no exogenous fluorophores have been applied. This so-called autofluorescence signal can be significant in tissue samples, and can interfere with accurate measurement of fluorescent probe signals. The effect of autofluorescence in tissue samples can be reduced or nearly eliminated if spectral libraries used for unmixing include a signal corresponding to sample autofluorescence. If such a signal is included, the autofluorescence signal is attributed to the autofluorescence component image when an image cube for a sample with autofluorescence is unmixed, and accurate signals are obtained for the component images associated with fluorescent dyes and probes.

SUMMARY

In general, in a first aspect, the disclosure features methods that include obtaining a first plurality of images of a sample, where each image in the first plurality of images corresponds to a different spectral band of illumination light incident on the sample or emission light from the sample, obtaining a second plurality of images of the sample, where each image in the second plurality of images corresponds to a different spectral band of illumination light incident on the sample or emission light from the sample, and using an electronic processor to: align the first and second pluralities of images based on information from a first image from the first plurality of images and a second image from the second plurality of images, where the first and second images correspond to a shared spectral band; and combine at least some members of the first plurality of images and at least some members of the second plurality of images to form an image stack.

Embodiments of the methods can include any one or more of the following features. Each pixel in the image stack can include spectral information derived from at least one member of the first plurality of images and spectral information derived from at least one member of the second plurality of images. Aligning the first and second pluralities of images can include using the electronic processor to spatially register the first and second pluralities of images so that each member of the first and second pluralities of images corresponds to a common region of the sample. Each pixel in the image stack can include spectral information corresponding to at least 5 different spectral bands of illumination light incident on the sample or emission light from the sample.

The methods can include using the electronic processor to unmix the image stack to obtain one or more component images, each of the component images including contributions from substantially only one component in the sample. One of the component images can correspond to autofluorescence from the sample. At least one of the component images can correspond to a component of the sample other than autofluorescence.

The methods can include using the electronic processor to analyze the sample based on the one or more component images to determine locations of features within the sample.

Each member of the first and second pluralities of images can correspond to fluorescence emission from the sample. Each member of the first plurality of images can correspond to fluorescence emission from the sample following illumination of the sample with light in a different wavelength band, and each member of the second plurality of images can correspond to fluorescence emission from the sample following illumination of the sample with light in a different wavelength band. The methods can include using a color camera to obtain the first and second pluralities of images.

Embodiments of the methods can also include any of the other features and/or steps disclosed herein, in any combination, as appropriate.

In another aspect, the disclosure features systems that include an illumination source configured to illuminate a sample with illumination light, a detector configured to obtain one or more images of the sample, and an electronic processor coupled to the detector and configured to: obtain a first plurality of images of the sample, where each image in the first plurality of images corresponds to a different spectral band of illumination light incident on the sample from the illumination source or emission light from the sample; obtain a second plurality of images of the sample, where each image in the second plurality of images corresponds to a different spectral band of illumination light incident on the sample from the illumination source or emission light from the sample; align the first and second pluralities of images based on information from a first image from the first plurality of images and a second image from the second plurality of images, where the first and second images correspond to a shared spectral band; and combine at least some members of the first plurality of images and at least some members of the second plurality of images to form an image stack.

Embodiments of the systems can include any one or more of the following features.

Each pixel in the image stack can include spectral information derived from at least one member of the first plurality of images and spectral information derived from at least one member of the second plurality of images. The electronic processor can be configured to align the first and second pluralities of images by spatially registering the first and second pluralities of images so that each member of the first and second pluralities of images corresponds to a common region of the sample. Each pixel in the image stack can include spectral information corresponding to at least 5 different spectral bands of illumination light incident on the sample or emission light from the sample.

The electronic processor can be configured unmix the image stack to obtain one or more component images, each of the component images including contributions from substantially only one component in the sample. One of the component images can correspond to autofluorescence from the sample. At least one of the component images can correspond to a component of the sample other than autofluorescence.

The electronic processor can be configured to analyze the sample based on the one or more component images to determine locations of features within the sample.

Each member of the first and second pluralities of images can correspond to fluorescence emission from the sample. Each member of the first plurality of images can correspond to fluorescence emission from the sample following illumination of the sample with light in a different wavelength band, and each member of the second plurality of images can correspond to fluorescence emission from the sample following illumination of the sample with light in a different wavelength band. The detector can include a color camera, and the electronic processor can be configured to use the color camera to obtain the first and second pluralities of images.

Embodiments of the systems can also include any of the other features and/or aspects and/or components disclosed herein, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Existing whole slide scanning systems have a number of practical limits that impose constraints on the quality of the images obtained and/or the slide scanning speeds. For example, the mechanical apparatus used to move the slide does not have perfect repeatability. Further, it is typically time-consuming to change epi-filters. Together, these limitations impose restrictions on the functionality of such systems.

To image a sample in multiple bands, each sample location is presented to the camera with each of the various epi-filters engaged. This is generally accomplished by one of two scanning strategies. The first strategy is to visit each location in the sample once, and while there, to take an image with each epi-filter in turn. This strategy is typically very slow, however, because the epi-filter is changed a great many times during the overall scan. The other strategy is to image a region spanning many locations with a given epi-filter, then change epi-filters and revisit each location in the region, continuing in this manner until the whole sample has been imaged with all epi-filters. The epi-filter is changed many fewer times, so the scanning can be done much more quickly. However, because the repeatability of the mechanical slide handing system is imperfect, the actual location typically shifts to a certain extent between successive scans of the same sample point. Thus, a given pixel in the final image does not typically correspond to exactly the same sample point for all spectral bands (each one of which corresponds to a different epi-filter). This degrades image quality and limits the kind of image analysis that can be performed. The result of the foregoing limitations is that whole slide imaging systems generally perform slowly and/or produce images with mis-registration between signals in various spectral bands.

The present disclosure features systems and methods for rapid whole slide imaging of biological samples, including without limitation tissue sections, samples derived from blood, and cytology samples. The methods and systems produce whole slide multispectral images, where each point in the sample is described by a signal spectrum containing five or more wavelength bands, and there is no spatial misalignment between images corresponding to the different bands. Further, in some embodiments, whole slide multispectral fluorescence images of samples are obtained in which the effect of sample autofluorescence is markedly reduced or eliminated.

The systems and methods disclosed herein provide for rapid whole slide imaging with spectral unmixing of multiple fluorescent species to reduce or eliminate crosstalk between spectrally overlapping fluorescent species. Where autofluorescence is present, its effects upon images and quantitative measurements can be reduced or eliminated. By using spectral unmixing techniques, the systems and methods disclosed herein provide for whole slide image acquisition and analysis to improve quantitation of signal levels and/or improved classification based on multispectral sample images. Methods and systems for spectral unmixing, image analysis, and classification based on multispectral images are disclosed, for example, in U.S. Pat. Nos. 7,321,791 and 7,953,264, the entire contents of each of which are incorporated herein by reference.

To achieve improve scanning speeds and image registration among images corresponding to different wavelength bands, the methods and systems disclosed herein are configured to perform a scan of a sample using M signal bands (e.g., at M different spectral bands), then scan it again using N signal bands, in which the first set of M signal bands and the second set of N signal bands have a spectral band that is shared. The shared spectral band need not be identical in its spectral properties, but should be similar enough that the signals in this band respond to substantially the same stain or structures in the sample.

Each scan may be performed using high-speed techniques known in the art, such as using a triple-band epi-filter cube and a color digital camera to acquire a set of images corresponding to M=3 bands in the first scan, and a set of images corresponding to N=3 bands in the second scan. Alternatively, a sample can be scanned using an M-band or N-band epi-filter cube together with an agile excitation source that cycles to various spectral bands while images are acquired with a monochrome digital camera. While M and N both have the value 3 in the examples above, more generally either or both of M and N can also exceed 3. For example, in some embodiments, M and/or N can be 4 or more. In certain embodiments, the number of images from that are combined to form a multispectral image stack can be 3 or more (e.g., 4 or more, 5 or more, 6 or more, 7 or more, 8 or more, 9 or more, 10 or more).

In some embodiments, when certain fluorescent samples are imaged, both sets of scans can include an image that corresponds to emission from the nuclear stain DAPI. Thus, for example, the first set of images can include an image corresponding to emission from DAPI (in a first wavelength band) and also, e.g., two or three other images corresponding to emission from the sample in two or three other wavelength bands. Similarly, the second set of images can include an image corresponding to emission from DAPI in the first wavelength band, and also, e.g., two or three other images corresponding to sample emission in two or three other wavelength bands. In certain embodiments, it can be advantageous for the two or three other wavelength bands in the first set of images to be completely distinct from the two or three other wavelength bands in the second set of images.

While the M bands acquired during the first scan are registered among themselves, and the N bands acquired during the second scan are registered among themselves, images of the first scan and images of the second scan are, in general, misaligned due to the limited mechanical repeatability of the scanner.

To correct this problem, the images from the two scans can be aligned to a common registration using the images corresponding to the wavelength band that is shared among the first and second scans (e.g., the image that corresponds to emission from DAPI in the example above). The same shift or image transformation that yields the best alignment in this shared band is applied to all images in the scan, after which the two scans can be combined into an image cube. By aligning the second scan to the first scan, or vice versa, and then combining all the images, a combined multispectral image featuring M+N images, each of which corresponds to a different spectral band, and all of which are perfectly registered, is obtained. The combined multispectral image is then suitable for spectral unmixing.

The choice of which band to use as the shared band depends on the sample and how it was prepared. In many biological samples of interest, a nuclear counterstain such as DAPI or Hoechst is applied, and a band that captures this emission may be a good choice. This is because in many cases, images of interest will contain some nuclei, so there will be enough information in this band to perform good image registration. More generally, the shared band is selected so that at least some of the same structures are present in the shared band images in both scans, and typically chosen so that some structures of interest are present in a majority of regions that contain sample material, so good image registration is attained across the whole sample.

Because the shared band corresponds to substantially the same stain or structures in the sample, in some embodiments, the combined multispectral image may include the shared band from just one of the scans (e.g., for a total of M+N−1 images). This may be done in recognition that the two shared band images contain similar information, as a way to reduce the memory size or disk size associated with the multispectral image cube. In certain embodiments, however, the shared band images from both scans are included in the combined multispectral image. In some embodiments, the two shared band images can be averaged, and only the averaged image is included in the combined multispectral image. The choice of retaining both shared band images, only one such image, or merging the shared band images into a single image can be made based on the degree of additional information that is expected from retaining both shared band images, the concern for disk or memory space use, or any factor that is judged to be important in a given situation. When both shared band images are retained, the result is a multispectral image cube with M+N images, and when only one shared band image is retained, the resulting multispectral image cube has M+N−1 images. Compared to whole slide scanning systems in which the epi-filter is cycled to multiple settings at each location in the sample, the methods and systems disclosed herein provide an enormous reduction in mechanical motion and overall acquisition time. For example, using a conventional whole slide scanning system, a typical sample may require 1000 individual fields to be imaged, which means that acquiring a 7-band multispectral image involves changing the epi-filter cube 7000 times. Even if a high-speed mechanism is used that can change filters in 0.5 seconds, this requires nearly 1 hour per slide just for the filter cycling, in addition to the time needed for exposure, camera readout, focusing, and so on.

To obtain the same type of multispectral information, the systems and methods disclosed herein change epi-filters just once, which typically takes about 1 second. Thus, a significant increase in scan speed is realized. Further, because far fewer mechanical operations (e.g., changing epi-filters) are involved, the lifetime and reliability of the imaging system is improved.

Alternatively, a whole-slide scanning system that scans a region of the sample, then changes epi-filters, will have misalignment between the images corresponding to the various spectral bands because mechanical scanners are generally unable to return the sample to the exact same location each time a new image is obtained. Thus, images corresponding to different spectral bands will generally not line up perfectly. Since whole-slide scanners are often called upon to produce images with a pixel size of 0.5 microns or smaller, non-repeatability at scales comparable to this, or larger, will cause images in the different spectral bands to be skewed from one another. In practice, conventional scanners are observed to have skew of up to 1 micron or more, so the signal levels in various bands of a given pixel may in fact correspond to different locations in the sample, from up to 2 pixels away or more. A set of such spectral images (e.g., images that each correspond to a single spectral band) cannot be unmixed accurately, so image analysis based on component strength will yield inaccurate results. Similarly, attempts to remove the contribution arising from autofluorescence in fluorescent imagery will not achieve this goal as reliably as if the signals in various bands corresponded to the same location in the sample.

In some embodiments, the image corresponding to the shared spectral band (e.g., the "shared band image") is also used to select the focus settings (e.g., the set of heights of the objective above the sample at each of the imaging locations in the sample) in the scans. Even in relatively thin samples such as 3-4 micron tissue sections, different structures are imaged depending on whether the focus is set to the top of the sample, the bottom, or some point in-between. This can impede the registration process, or produce degraded registration, since there may be no way to perfectly register the images. Using the shared band image for selection of the focus setting has benefits beyond just improving the ease or quality of lateral registration that is attained. For example, it is generally beneficial when the two sets of images (e.g., corresponding to the first and second scans) being merged correspond to the same depth within the sample. If they do not, then the signal levels in the images corresponding to the different spectral bands do not correspond to the same location. Since the signals do not correspond to the same location in the image, it is not possible to unmix them accurately into component images. By using a shared band image and the same auto-focus mechanism and rules for both the first and second scans, the degree of focus shift within the sample is reduced, and image registration is enhanced. As explained above, the optical properties of the shared band need not be identical for the two scans. That is, the shared band does not need to correspond to exactly the same set of wavelengths, weighted in exactly the same manner, in both scans. Instead, in each scan, the shared band corresponds to a wavelength band in which substantially the same fluorescent species are viewed, so that sufficiently similar structures are presented in similar enough proportional brightness so that a good registration can be obtained.

In certain embodiments, the focus settings used for the first scan can be reused for the second scan. This eliminates the need to re-determine the focus settings, and ensures that the exact same settings will be used, within the limits of reproducibility for the scan apparatus.

A variety of different components can be used in the systems disclosed herein. In some embodiments, for example, the detector used to obtain sample images can be a color camera with individual color channels. One example of such a camera is the Hamamatsu C7780-10 Orca-3CCD color camera (available from Hamamatsu Photonics, Hamamatsu City, Japan), whose individual color channels have spectral response shown as 301, 302, and 303 in FIG. 3. This camera was used to image a sample that is a 4 micron tissue section from a formalin-fixed, paraffin-embedded block of tissue taken from a breast cancer biopsy, prepared with a first immunofluorescent (IF) label targeting estrogen-receptor (ER) with Texas Red; a second IF label targeting Ki-67 with Alexa Fluor 488; and a counterstain of 4',6'-diamidino-2-phenylindole (DAPI). A first scan of the sample was taken using the epi-filter set that is represented by the spectra shown in FIG. 1 (where the excitation filter response 101 includes principal spectral bands 104a, 104b, and 104c, the emission filter response 102 includes principal spectral bands 105a, 105b, and 105c, and the dichroic reflector transmission is indicated by curve 103), and a second scan was taken using the epi-filter set represented by the spectra shown in FIG. 2 (where the excitation filter response 111 includes principal spectral bands 114a, 114b, and 114c, the emission filter response 112 includes principal spectral bands 115a, 115b, and 115c, and the dichroic reflector transmission is indicated by curve 113). For both the first and second scans, the camera's blue channel was used to determine the focus position. Also, the camera's gamma was set to 1, and the white-point correction was disabled or set to manual.

In certain embodiments, raw signals from the sensors within the camera are recorded and used directly form spectral images and for image analysis. In many RGB cameras, the raw signal levels from individual sensors or pixels are processed to produce the RGB image that the camera provides. Typically, the camera's processing involves multiplying the red, green, and blue signal levels from the sensor(s) by a color correction matrix (CCM) to obtain the output image color values. In some embodiments, it can be advantageous to disable the use of a CCM (and/or other internal camera processing algorithms), and to instead directly obtain the raw signal levels from the individual sensors or pixels when possible. For example, the command set for a given digital camera may provide a way to request the raw signal levels. As another example, for a particular camera, it may be possible to specify the CCM, in which case the CCM can be effectively disabled by setting the CCM to the 3×3 identity matrix. It has been generally observed that if it is not possible to obtain the raw signals directly from the camera's sensors, then the CCM will add cross-talk between the color channels, and may also add noise as well.

In some embodiments, the gain, exposure time, and excitation light are adjusted to yield a strong signal that is free of saturation. By avoiding saturation of the camera, accurate quantitative signals can be measured. Some cameras provide separate adjustment of these parameters for each color plane, and if so, signals in the red, green, and blue channels can be balanced.

In certain embodiments, a dark signal is recorded, particularly if the camera signals differ significantly from zero when no light is present. The camera signal measured with no light incident on the camera is referred to as the dark signal. In some embodiments, the dark signal is a single numerical value that corresponds to an average dark signal across all pixels in the camera. In certain embodiments, the dark signal corresponds to an image for which the camera's measured signal with no light present is provided on a pixel-by-pixel basis. The dark signal can be obtained by shuttering the camera and/or by shuttering the incident light (e.g., preventing incident light from reaching the camera), and obtaining an image of a nominally dark scene using the camera. A full image may be retained if the dark signal is to be a pixel-by-pixel reference. Alternatively, some or all pixels in a given image plane may be averaged to produce a vector of values representing the dark signal in each of the raw blue, green, and red channels. Further, if the dark signal in each of the channels are similar enough, a single value may be used for all pixels of all channels.

Figure 1:
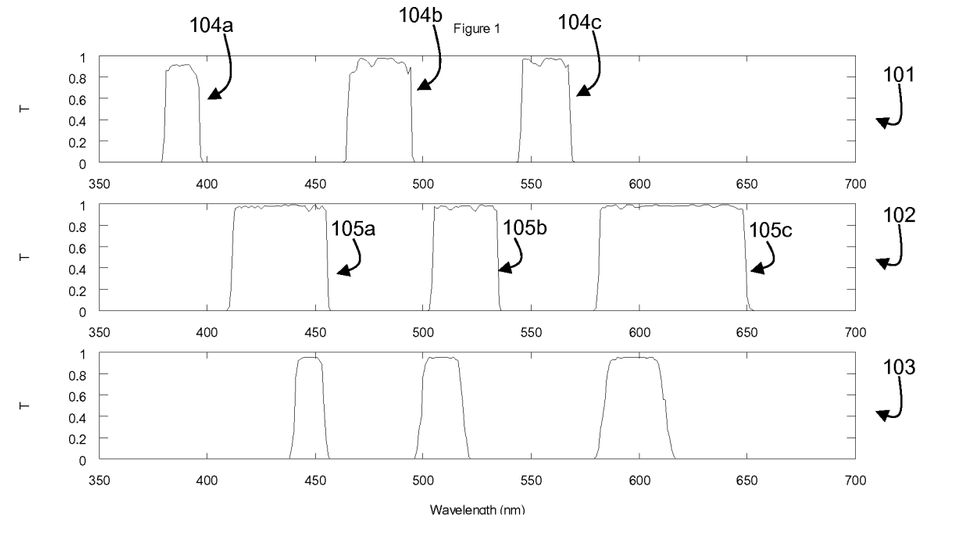
FIG. 1 is a set of graphs showing spectral bands corresponding to a set of epi-filters.
Figure 2:
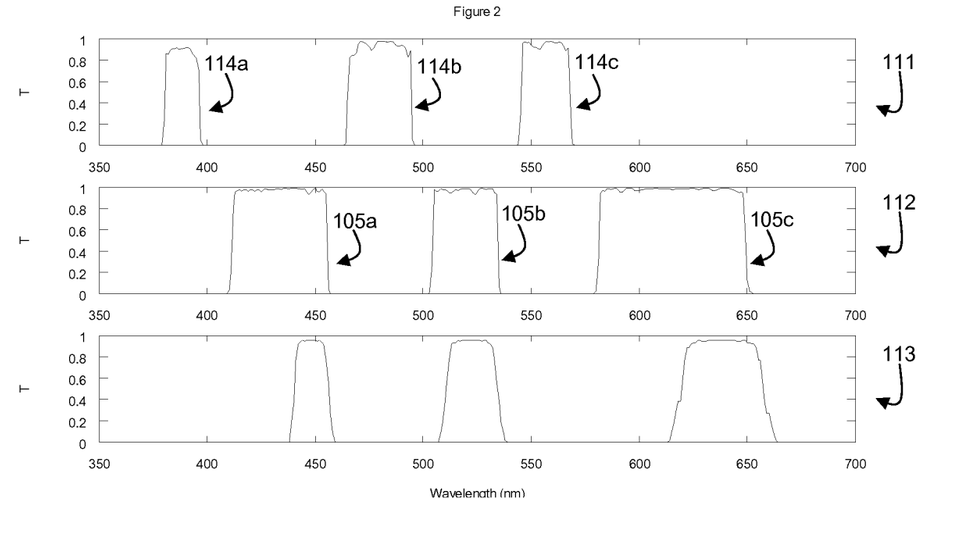
FIG. 2 is a set of graphs showing spectral bands corresponding to another set of epi-filters, where the excitation and dichroic filters are the same as in the set of epi-filters of FIG. 1.

After obtaining a first scan of the sample using the epi-filter set that is represented by the spectra shown in FIG. 1, and a second scan using the epi-filter set represented by the spectra shown in FIG. 2, as described above, each of the two scans includes three images corresponding to three different spectral bands. The two scans are registered using the image corresponding to the blue spectral band (i.e., the shared spectral band). The blue spectral band includes strong contributions from DAPI counterstain in the sample nuclei, which are present in essentially all image fields that include the sample.

Various methods can be used to register the first and second scans. In some embodiments, for example, the first scan is taken as a reference, and the second scan is registered to the first scan by finding a transformation of the second scan to the first scan. Then, after the images of the second scan have been transformed, an image stack is assembled using images from the first scan and transformed images from the second scan. Alternatively, in certain embodiments, the second scan is taken as a reference, and the first scan is registered to the second scan by finding a transformation of the first scan to the second scan. In either case, the transformation can be performed after the first and second scans are complete, or the transformation can be performed while images of the first or second scan are being obtained.

The methods and systems disclosed herein can use a variety of transformations to align images of the first and second scans. In some embodiments, the transformation used includes a Cartesian translation, which corrects for shifts in position between images of the first scan and images of the second scan (and any subsequent scan(s)). In certain embodiments, the transformation can include a rotational transformation to correct for rotational differences between the images. Rotational transformations can be advantageous in systems where the relative orientation of the sample and detector can vary between scans.

More generally, any one or more transformations, including translations, rotations, magnifications, and/or image warping, can be used to register images of the first and second scans to correct for imaging variations between scans. The selection of one or more transformations can be made based upon the nature of the sample and the configuration of the imaging system, for example.

In some embodiments, a transformation that includes a translation (i.e., a shift or offset) to correct for offsets in the X and Y location of the images is sufficient. One method for determining an appropriate translation is to perform a cross-correlation between the image corresponding to the shared spectral band in the first and second scans, and to compare the degree of correlation as a function of X and Y offset. For example, if $SB_1$ and $SB_2$ are the spectral images corresponding to the shared spectral band in the first and second scans, respectively, then the cross-correlation (XC) can be calculated according to:

$$XC(\delta x, \delta y) = \Sigma_{i=0}^{w} \Sigma_{j=0}^{h} SB_1(i,j) \; SB_2(i+\delta x, j+\delta y) \qquad [1]$$

where i and j are indices of $SB_1$ and $SB_2$, w and h are the dimensions of $SB_1$ and $SB_2$ (e.g., $SB_1$ and $SB_2$ are each images with dimensions of w×h), $\delta x$ is an offset in one of the image directions (e.g., the X direction), and $\delta y$ is an offset in the other image direction (e.g., the Y direction). The offset (dx, dy) that yields a maximum value of XC is typically used to transform the spectral images; the transformation can include, for example, translating image $SB_2$ by the amount of offset (dx, dy), e.g., by dx in the X direction and by $\delta y$ in the Y direction.

In general, the cross-correlation in Equation (1) is only evaluated over a range of $\delta x$ and $\delta y$ that is large enough to correct for the anticipated image shift between the first and second scans. Restricting the cross-correlation in this manner reduces the calculation burden involved in identifying (dx, dy), and also prevents choosing distant, false maxima in the XC.

In certain embodiments, an optimized transformation is determined for each spectral image, and then each spectral image is transformed according to its optimized transformation. Alternatively, in some embodiments, an optimized transformation is determined only once for one of the spectral images in the scan, and then all images in the scan are transformed using the optimized transformation. As another alternative, optimized transformations can be determined for several locations in a spectral image (e.g., as for all fields in a grid), and individual spectral images can be transformed using transformations based on their location, the locations for which best transformations were determined, and the transformations determined at those locations. The choice of which approach to use can be made based on the properties of the imaging system, and whether a given transformation is valid over the whole scan, a region, or only one image.

When images are shifted by different amounts as a result of a transformation, there can be overlaps or voids between adjacent images after the transformation is applied. Thus there may be two values, or no values, corresponding to some locations in the transformed image. Where two values are available, one value can be ignored, or the average of the two may be used.

When voids are present (e.g., no values correspond to certain locations in the transformed image), a variety of methods can be used to introduce values into the transformed image. For example, in some embodiments, the camera acquires images over a slightly larger region than is normally used, to provide a small perimeter region for stitching of adjacent images. If the extra pixels in the perimeter region are available at the time that the transformation is performed, these pixels can be used to supply the proper value in the voids. As another example, in certain embodiments, interpolation may be used to supply the missing values as the gaps are generally small. As a further example, regions with voids can be flagged as invalid for later processing.

Figure 5:
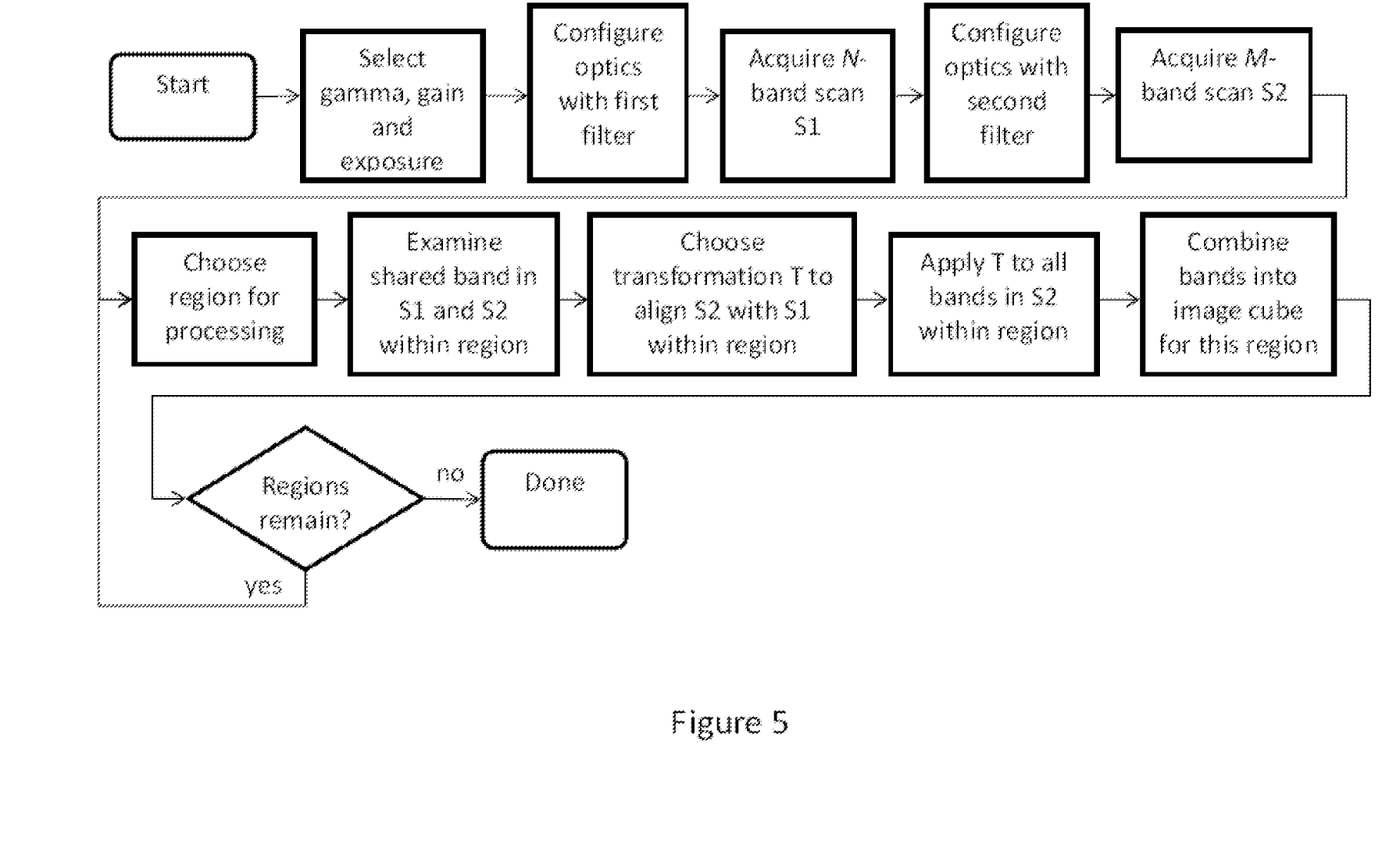
FIG. 5 is a flow chart showing a series of steps for forming a multispectral image of a sample.

After the spectral images of at least one of the two scans are transformed, the images of the two scans are combined to form an image stack. Combining the images can include storing the images in a single computer file, placing the images from the scans adjacent one another in memory within a computer, and/or storing the images as scans in separate computer files that are known to be associated with one another. In general, any method can be used to combine the images of the first and second scans so that they are logically grouped together and form a digital slide that features some images corresponding to spectral bands from both scans. The foregoing steps are shown schematically on the flow chart of FIG. 5.

Figure 3:
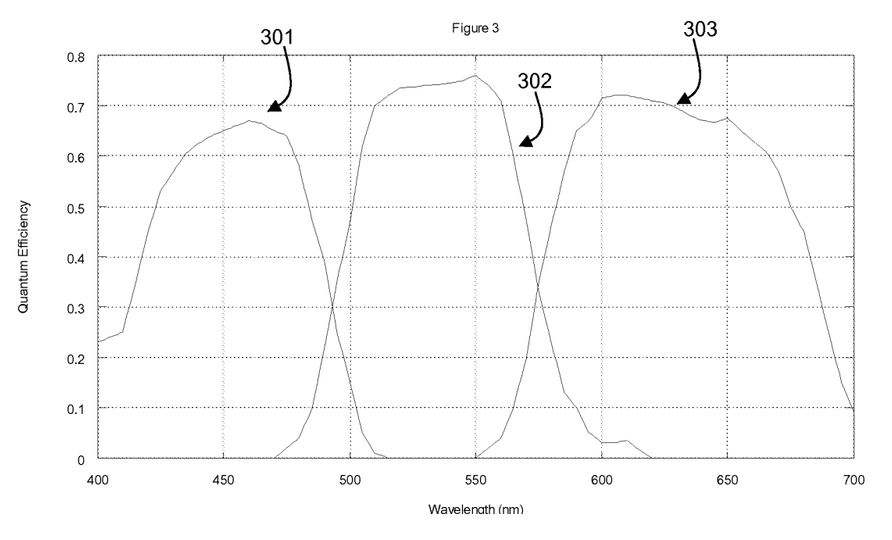
FIG. 3 is a graph showing the spectral response of individual color channels in a RGB camera.

Returning to the example shown in FIGS. 1-3, images corresponding to the two blue (DAPI) spectral bands were averaged to form a single image in the combined image stack. The images corresponding to the green and red bands were separately included in the image stack, yielding a total of five spectral images in the image stack (e.g., one averaged spectral image corresponding to the blue spectral band, spectral images corresponding to the green and red spectral bands for the first scan, and spectral images corresponding to the green and red spectral bands for the second scan). The blue shared spectral band image (which included contributions largely from DAPI in cell nuclei) corresponds to the average of measured pixel intensities in the first scan image corresponding to emission band 105a and in the second scan image corresponding to emission band 115a. The green spectral images in the image stack correspond to emission bands 105b and 115b, and the red spectral images in the image stack correspond to emission bands 105c and 115c. Combined, the red, green, and shared blue spectral images, when combined, provide a 5-point spectrum for each point (e.g., pixel) in the combined image stack.

The image stack formed by the combination of the 5 spectral images discussed above provides more information about the spectral composition of the sample than is provided by either of the scans alone. Further, because the image stack is formed from spectral images that are spatially registered (e.g., to within 1 pixel), each pixel in each spectral image of the image stack corresponds to substantially the same location in the sample. Accordingly, information that is derived for each pixel from the image stack corresponds to a single location in the sample, and can be used for spectral and image analysis.

In some embodiments, the sample can be scanned using an imaging system with a monochrome camera and sequential illumination. One such scanner is the P250 scanner available from 3DHistech (Budapest, Hungary), which uses a scientific CMOS (sCMOS) monochrome camera from PCO (Kelheim, Germany) together with an electronically controlled agile light source from Lumencor (Beaverton, Oreg.). To scan a sample using a monochrome camera in the imaging system, a first scan is acquired using the filter set shown in FIG. 1. At each location in the sample, the system acquires an image while the sample is illuminated with light in spectral band 104a. Then, for each location in the sample, the system acquires an image while the sample is illuminated with light in spectral band 104b. Further, for each location in the sample, the system acquires an image while the sample is illuminated with light in spectral band 104c.

A monochrome camera detects light in all spectral bands (e.g., spectral bands 105a, 105b, and 105c) each time the sample is imaged. As a result, the measured signals from the monochrome camera are different from those measured when a color camera is used with simultaneous illumination in all spectral bands 104a, 104b, and 104c. The color camera provides 3 distinct signals according to the wavelength or color of the light emitted by the sample, whereas the monochrome camera with sequential illumination provides 3 distinct signals according to the wavelength or color of the light used to illuminate the sample.

Next, a second scan of the sample is acquired using the filter set shown in FIG. 2. The spectral excitation bands 114a, 114b, and 114c are substantially the same as those used to obtain the first scan (e.g., spectral bands 104a, 104b, and 104c), and the process for obtaining the second scan is the same as described above for the first scan. However, as shown in FIGS. 1 and 2, because the emission filter peaks 115a, 115b, and 115c for the images in the second scan are red-shifted compared with those of the first scan (e.g., 105a, 105b, and 105c), the spectral images of the second scan will, in general, be different from the spectral images of the first scan.

The first and second scans can then be co-registered using the spectral images obtained when illuminating the sample using light in spectral band 104a for the first scan, and in spectral band 114a for the second scan. Spectral bands 104a and 114a are chosen as the shared band for registration because each corresponding spectral image includes contributions from light emitted by the DAPI counterstain the sample nuclei. The images corresponding to spectral bands 104a and 114a can also be used for focusing in each scan.

Following co-registration of the first and second scans, the images of the scans can be combined to form a multispectral image stack. As an example, the spectral image corresponding to the shared band from the second scan (e.g., spectral band 114a) can be discarded, the image stack can include images corresponding to the following combinations of illumination and emission spectral bands: 104a and 102; 104b and 102; 104c and 102; 114b and 112; and 114c and 112.

In some embodiments, reduced exposure time is used when acquiring spectral images that will not be combined to form the image stack. For example, because the spectral image corresponding to the combination of illumination band 114a and emission band 112 is used only for co-registration of spectral images in the first and second scans, this image can be obtained at lower signal-to-noise ratio (SNR) than the spectral images that are included in the image stack. The cross-correlation calculation used to determine the optimum transformation, because it involves two images, generally does not require a high SNR, because it is a statistical property that involves contributions from many pixels; a high SNR is not required at each individual pixel in order to have high confidence that the optimum transformation has been achieved.

In some embodiments, spectral unmixing is performed on the image stack formed by combining spectral images from the first and second scans. Spectral unmixing provides a method for isolating the spectral contributions of various species present in the sample, including exogeneous fluorophores such as DAPI, Alexa Fluor 488, and Texas Red. In certain embodiments, spectral unmixing is used to estimate the contribution to the acquired images from sample autofluorescence (AF). Determining AF and correcting for it allows measurement errors that would otherwise occur from attributing all the energy to the exogenous fluors to be avoided.

To perform spectral unmixing, spectral control samples can be used to provide reference information about specific spectral contributors in a sample of interest. For example, several control samples can be prepared that contain, respectively, only the counterstain DAPI, only Texas Red, only Alexa Fluor 488, and no exogenous fluors (e.g., so that the only fluorescence contribution is from autofluorescence). These control samples are used to obtain estimates of the pure spectra associated with the individual fluors and with sample autofluorescence. The control samples can be acquired on tissue from the same block, or on other tissue. Acquiring the samples from other tissue can have certain advantages. For example, clinical patient samples may be available only in limited quantity, and in many cases the spectral information can be learned from more abundant tissue material.

To obtain estimates of the pure spectra of sample components, in general, it is not necessary to obtain images across the full spatial extent of the control samples. This is because, generally, only information about the spectral response of the control samples is needed, not complete control sample images. To obtain information about the spectral response of control samples, a variety of techniques can be used. For example, a local scan can be obtained of a small region of the control samples, or only one image of each of the control samples can be obtained, to provide the spectral response information. Images of a specific location in the sample can be obtained with the first filter in place, using illumination light in spectral bands 104a, 104b, and 104c in sequence, for example, and images can be obtained with the second filter in place, using illumination light in spectral bands 114a, 114b, and 114c. These images can then be assembled into an image stack that includes images from only a single location in the control sample. Alternatively, in certain embodiments, this procedure can be repeated to scan a small region of the control sample, by repeating the process at a number of locations in the small region of the control sample. This procedure is slower than acquiring an image at only a single location, but may still be sufficiently rapid for certain samples.

In some embodiments, two complete scans of a control sample are performed, registered to one another, and combined into a multispectral scan. This method can be used when the images in each scan that correspond to the shared spectral band include enough information to register the scans. However, this may be difficult for certain samples. For example, when scanning samples that do not contain DAPI, the spectral bands corresponding to images taken with the excitation filters that correspond to spectral bands 104a and 114a may not contain suitable information for registering the two scans together: there may be little signal or structure in the images that correspond to these spectral bands. As an alternative, a different shared spectral band can be selected to perform the registration. For example, the images that correspond to illumination in spectral bands 104b and 114b can be used to register the scans of the Alex Fluor 488 control sample. As another example, the images that correspond to illumination in spectral bands 104c and 114c can be used to register the scans of the Texas Red sample. Images obtained with illumination in any of the spectral bands 104a/b/c and 114a/b/c can generally be used for registering the autofluorescence control, if there is sufficient signal.

Figure 6:
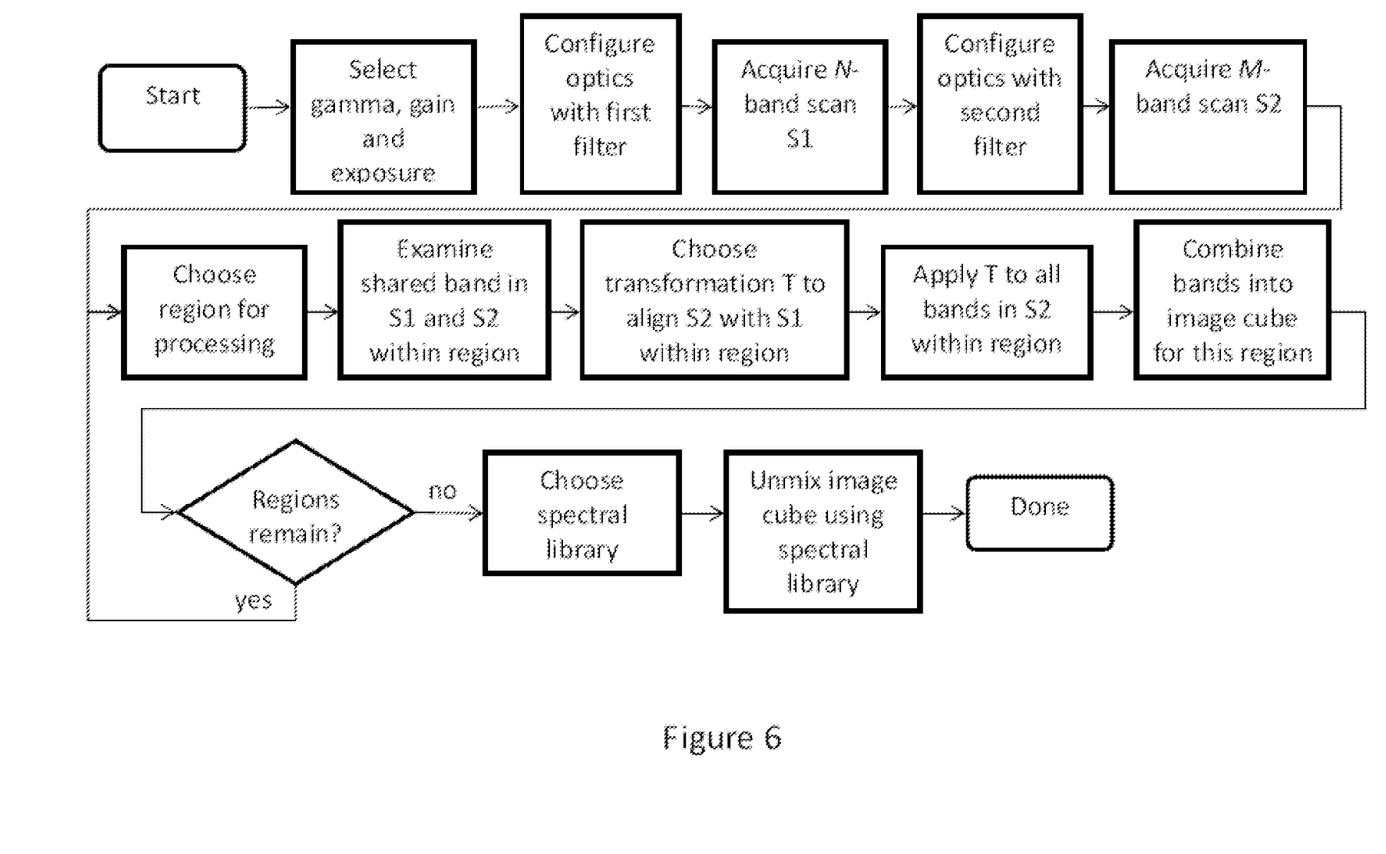
FIG. 6 is a flow chart showing a series of steps for forming a multispectral image of a sample and unmixing the image.

A spectral library can be constructed from the spectral images (or scans) of the spectral control samples. Using the spectral library, an image stack for a sample of interest can be spectrally unmixed into component images, each corresponding to spectral contributions from substantially only one of the various stains and/or autofluorescence. Software for performing spectral unmixing is available, including Nuance from PerkinElmer (Hopkinton, Mass.) and ENVI from Exelis (Boulder, Colo.). Use of a spectral library together with the registration methods disclosed herein is shown schematically in the flow chart of FIG. 6.

Spectral unmixing yields a set of component images that indicate the location and amount of the various stains in the sample. The component images are a rich dataset for various kinds of image analysis, including expression measurements, co-localization, positivity analysis, and assessment of biomarker indices (cancer prognostics, patient stratification, etc.) that involve these quantities, or any quantitative measurement of stained tissue.

Figure 7:
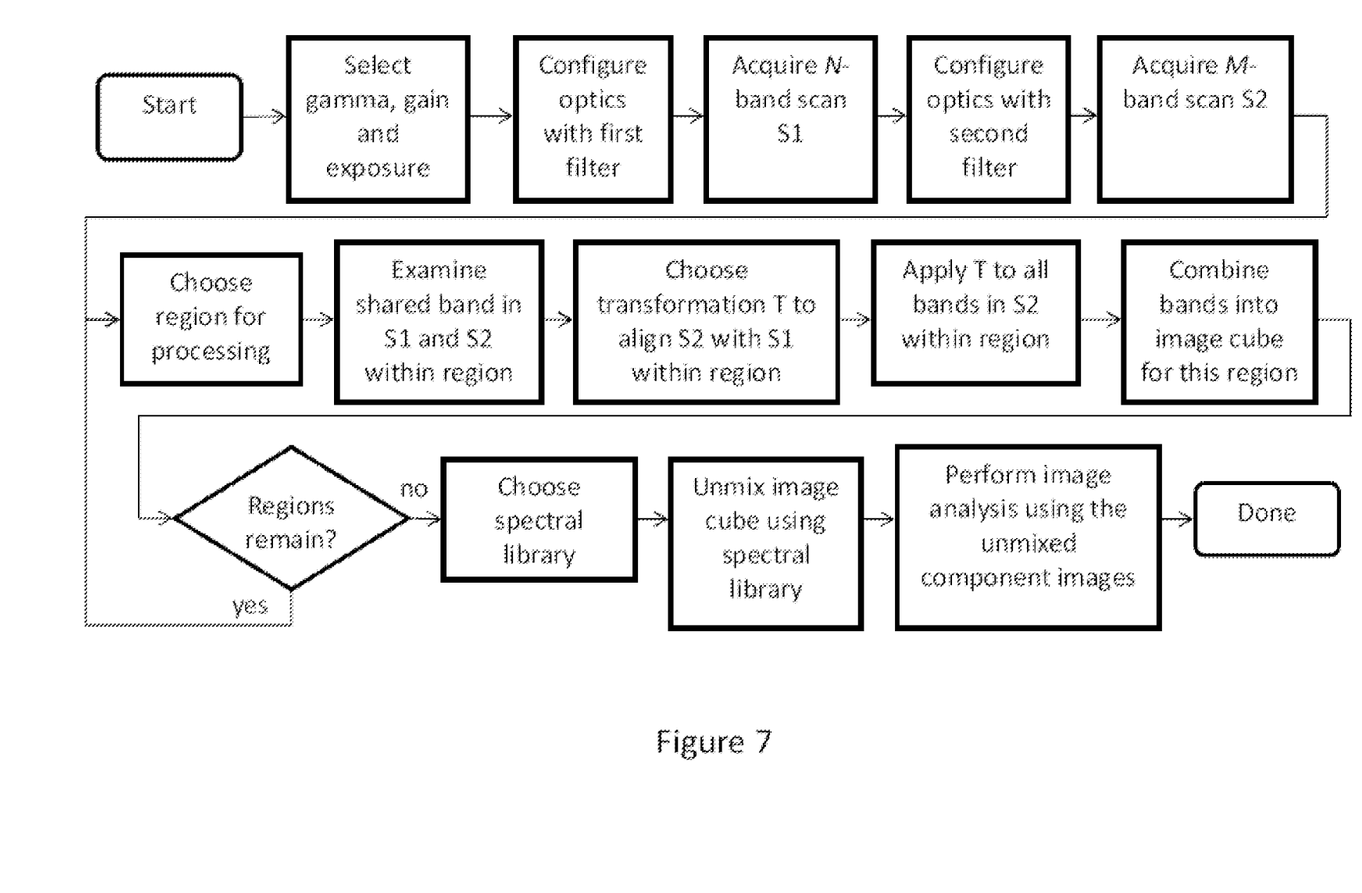
FIG. 7 is a flow chart showing a series of steps for acquiring and unmixing an multispectral image of a sample and performing image analysis on the component images.

The component images are suitable for image analysis and object classification using a variety of techniques. Suitable techniques for analysis and classification are described, for example, in U.S. Pat. Nos. 7,155,555 and 8,280,140, the entire contents of each of which are incorporated herein by reference. As a result, the measurements and analysis disclosed herein can include acquiring images and processing them as described above, image pre-processing and unmixing into component images, object classification to find tissue structures, cells, or sub-cellular compartments, and measurement of protein expression by assessing signal levels in the unmixed components. Use of the component images obtained from unmixing the image stack is shown schematically in the flow chart of FIG. 7.

The improved accuracy provided by the systems and methods disclosed herein results in more accurate measurements of individual fluors in samples of interest, and also ensures that spatially co-localized fluors can be detected or measured more reliably. For example, fluors can be used in combination, even when they are expressed in overlapping or identical biological structures. Also, because the systems and methods disclosed herein can produce multispectral image stacks (e.g., image cubes) with images corresponding to 4 or more spectral bands, or 5 or more spectral bands, or 6 or more spectral bands, it is possible to spectrally unmix a sample's image stack into spectral contributions from N species, where N>3.

Thus the systems and methods disclosed herein provide for increased accuracy in scanning and quantifying samples that have been prepared with a single IF species, for more reliable and accurate measurements of scanned samples that have been prepared with two IF species, and for measurement of N=3, 4, or 5 species in a sample, such as three or four IF species and a counterstain. Measurements that involve co-localization of one or more IF species with one another, or with a counterstain, are especially well suitable for the systems and methods disclosed herein.

As another example, the Lumencor solid-state illuminator described above can be replaced by a Prior Lumen 200 lamp with a Prior HF108 motorized filter wheel. The time to change between filters is 55 ms, if the filters are arranged so successive exposures use filters in adjacent filter positions. This time change may be tolerable in a variety of applications.

Figure 4:
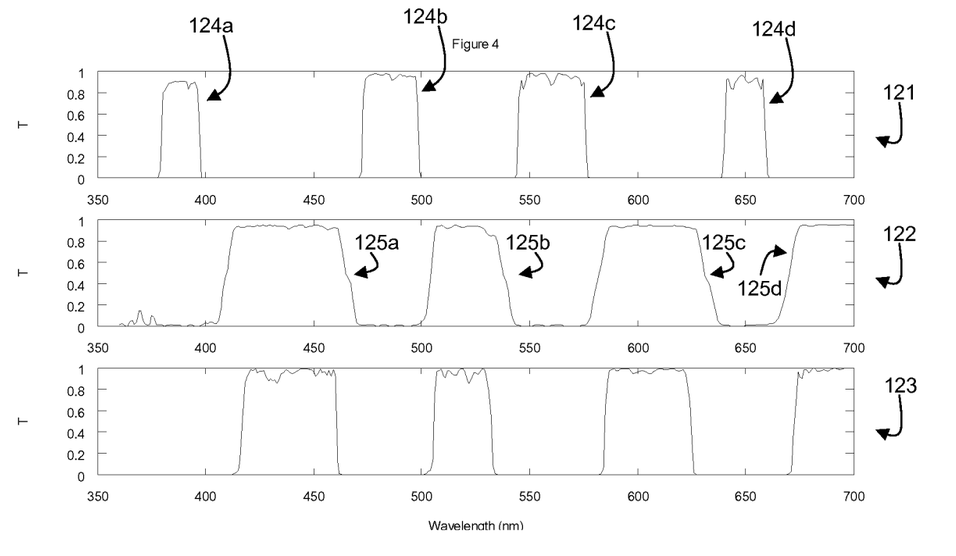
FIG. 4 is a set of graphs showing spectral bands corresponding to another set of epi-filters.

In a further example, a sample can be imaged once using an epi-filter set with a spectral response as shown in FIG. 1, and then a second time with an epi-filter set whose spectral response is shown in FIG. 4 (where the excitation filter response 121 includes principal spectral bands 124a, 124b, 124c, and 124d, the emission filter response 122 includes principal spectral bands 125a, 125b, 125c, and 125d, and the dichroic reflector transmission is indicated by curve 123). The light source is configured to illuminate the sample with light in each of the bands 104a, 104b, and 104c for the first scan, and to illuminate the sample with light in each of the bands 124a, 124b, 124c, and 124d for the second scan. A total of 7 images are acquired, with the following spectral band/filter combinations: 104a/102, 104b/102, 104c/102, 124a/122, 124b/122, 124c/122, and 124d/122.

Images corresponding to illumination in spectral bands 104a and 124a (e.g., the shared spectral band) can be used to co-register the two scans. In both images, the nuclei in the sample are evident because DAPI is strongly excited and its emissions are captured by the camera in these cases. This enables finding the optimum transformation to register the two images, and forming a multispectral image stack where images from one or both of the scans have been transformed so that they are co-registered. Using any of the methods and systems disclosed herein permits rapidly acquiring a highly accurate image stack (e.g., image cube) in which all signals at each given pixel in the image stack arise from the same location in the sample. Although in some embodiments a perfect co-registration may not be possible, the methods and systems disclosed herein provide for improved registration, relative to the case where no registration occurs.

Where the examples described previously involved using substantially the same set of excitation bands, and gained additional information about the sample by changing the emission filter, this example changes both excitation and emission between the first and second scans. Such methods can have certain advantages. First, changing the spectral bands of both illumination and emission provides more spectral excitation bands and thus facilitates imaging with a greater number of fluors. Second, the method provides information about the excitation response of the sample, for purposes such as isolating the autofluorescence signal. In this example, the sample can be prepared with probes using other fluors such as Alexa Fluor 568 or Alexa Fluor 647, in order to image additional components in the sample. The resulting image cube can be unmixed to obtain component images for up to 6 species in this case.

In some embodiments, the systems and methods disclosed herein can permit fluorescence whole-slide scanning, but without using epi-illumination. Instead, dark-field illumination of the sample is used. This can provide greater flexibility overall, since dichroic mirror are not used, as is typical in epi-illumination. Consequently, the optical filter system can be designed with greater freedom.

In some embodiments, three or more scans can be combined to obtain yet further information about a sample. The decision regarding the number of scans to combine, and what images (corresponding to specific spectral bands) to include in each scan, depends upon the sample being imaged and the spectral properties of the fluors and autofluorescence it contains. Photobleaching becomes a greater concern as a sample is imaged repeatedly, and is valuable to minimize the time the sample is exposed to ultraviolet light (as is used for the DAPI and Hoechst fluors). One strategy for this is to use shorter exposure for these spectral bands in all scans except one, which is used as the primary DAPI or Hoechst image.

Figure 8:
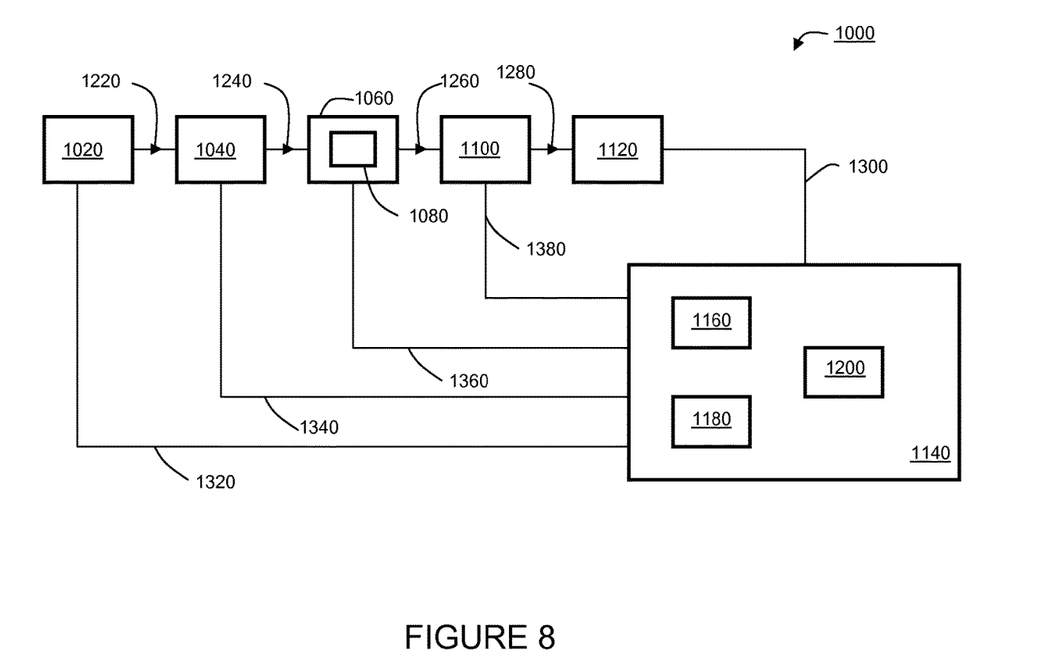
FIG. 8 is a schematic diagram of a system for acquiring spectral images of a sample.

FIG. 8 is a schematic diagram showing a system 1000 for acquiring multiple spectrally resolved images of a sample. A light source 1020 provides light 1220 to light conditioning optics 1040. Light 1220 can be incoherent light, such as light generated from a filament source for example, or light 1220 can be coherent light, such as light generated by a laser. Light 1220 can be either continuous-wave (CW) or time-gated (i.e., pulsed) light. Further, light 1220 can be provided in a selected portion of the electromagnetic spectrum. For example, light 1220 can have a central wavelength and/or a distribution of wavelengths that falls within the ultraviolet, visible, infrared, or other regions of the spectrum.

Light conditioning optics 1040 can be configured to transform light 1220 in a number of ways. For example, light conditioning optics 1040 can spectrally filter light 1220 (e.g., using epi-filters) to provide output light in a selected wavelength region of the spectrum. Alternatively, or in addition, light conditioning optics can adjust the spatial distribution of light 1220 and the temporal properties of light 1220. Incident light 1240 is generated from light 1220 by the action of the elements of light conditioning optics 1040.

Incident light 1240 is directed to be incident on sample 1080 mounted on illumination stage 1060. Stage 1060 can provide means to secure sample 1080, such as mounting clips or other fastening devices. Alternatively, stage 1060 can include a movable track or belt on which a plurality of samples 1080 are affixed. A driver mechanism can be configured to move the track in order to successively translate the plurality of samples, one at a time, through an illumination region on stage 1060, whereon incident light 1240 impinges. Stage 1060 can further include translation axes and mechanisms for translating sample 1080 relative to a fixed position of illumination stage 1060. The translation mechanisms can be manually operated (e.g., threaded rods) or can be automatically movable via electrical actuation (e.g., motorized drivers, piezoelectric actuators).

In response to incident light 1240, emitted light 1260 emerges from sample 1080. Emitted light 1260 can be generated in a number of ways. Typically, incident light 1240 can be absorbed by sample 1080, and emitted light 1260 corresponds to fluorescence emission from sample 1080 in response to incident light 1240.

In many embodiments, sample 1080 is a biological sample such as a tissue slice (e.g., a sample used for pathology, or a cell suspension or smear, as in cytology studies), or living or fixed cells in tissue culture. Sample 1080 is typically positioned on a slide, which is held in position by stage 1060.

Light collecting optics 1100 are positioned to received emitted light 1260 from sample 1080. Light collecting optics 1100 can be configured to collimate emitted light 1260 when light 1260 is divergent, for example. Light collecting optics 1100 can also be configured to spectrally filter emitted light 1260. Filtering operations can be useful, for example, in order to isolate a portion of emitted light 1260 arising via one of the mechanisms discussed above from light arising via other processes. Further, light collecting optics 1100 can be configured to modify the spatial and/or temporal properties of emitted light 1260 for particular purposes in embodiments. Light collecting optics 1100 transform emitted light 1260 into output light 1280 which is incident on detector 1120.

Detector 1120 includes one or more elements such as CCD and/or CMOS sensors configured to detect output light 1280. Detector 1120 generates an electrical signal that corresponds to output light 1280, and is communicated via electrical communication line 1300 to electronic control system 1140.

Electronic control system 1140 includes a processor 1160, a display device 1180, and a user interface 1200. In addition to receiving signals corresponding to output light 1280 detected by detector 1120, control system 1140 sends electrical signals to detector 1120 to adjust various properties of detector 1120. For example, if detector 1120 includes a CCD sensor, control system 1140 can send electrical signals to detector 1120 to control the exposure time, active area, gain settings, and other properties of the CCD sensor.

Electronic control system 1140 also communicates with light source 1020, light conditioning optics 1040, illumination stage 1060, and light collecting optics 1100 via electrical communication lines 1320, 1340, 1360, and 1380, respectively. Control system 1140 provides electrical signals to each of these elements of system 1000 to adjust various properties of the elements. For example, electrical signals provided to light source 1020 can be used to adjust the intensity, wavelength, repetition rate, or other properties of light 1220. Signals provided to light conditioning optics 1040 and light collecting optics 1100 can include signals for configuring properties of devices that adjust the spatial properties of light (e.g., spatial light modulators) and for configuring spectral filtering devices, for example. Signals provided to illumination stage 1060 can provide for positioning of sample 1080 relative to stage 1060 and/or for moving samples into position for illumination on stage 1060, for example.

Control system 1140 includes a user interface 1200 for displaying system properties and parameters, and for displaying captured images of sample 1080. User interface 1200 is provided in order to facilitate operator interaction with, and control over, system 1000. Processor 1160 includes a storage device for storing image data captured using detector 1120, and also includes computer software that embodies instructions to processor 1160 that cause processor 1160 to carry out control functions, such as those discussed above for example. Further, the software instructions cause processor 1160 to mathematically manipulate the images captured by detector 1120 and to carry out the steps of analyzing sample images, unmixing sample images, and classifying the unmixed images.

In many embodiments, system 1000 is configured to acquire multiple spectral images of sample 1080. The multiple spectral images may correspond to illumination of sample 108 at a variety of selected wavelengths of light, and detecting an intensity of light emitted by sample 1080. Alternatively, the multiple spectral images may correspond to illumination of sample 1080 with light having similar spectral properties, and collecting multiple images of sample 1080, each image corresponding to a different wavelength of emitted light 1260. Still further, the multiple spectral images may correspond to illumination of sample 1080 with light at different wavelengths (e.g., in different spectral bands), and detecting emitted light from sample 1080 at different wavelengths (e.g., in different spectral bands). Spectral filtering elements in light conditioning optics 1040 and light collecting optics 1100 are generally used to obtain the spectrally resolved data.

In some embodiments, light conditioning optics 1040 include an adjustable spectral filter element such as a filter wheel. The filter element can be configured to provide for illumination of sample 1080 using different light wavelength bands. Light source 1020 can provide light 1220 having a broad distribution of spectral wavelength components. A selected region of this broad wavelength distribution is allowed to pass as incident light 1240 by the filter element in light conditioning optics 1040, and directed to be incident on sample 1080.

Hardware and Software

The steps described above in connection with various methods for collecting, processing, analyzing, interpreting, and displaying information from samples can be implemented in computer programs using standard programming techniques. Such programs are designed to execute on programmable computers or specifically designed integrated circuits, each comprising an electronic processor (e.g., processor 1160), a data storage system (including memory and/or storage elements), at least one input device, and least one output device, such as a display or printer. The program code is applied to input data (e.g., images from the detector) to perform the functions described herein and generate output information (e.g., images showing classified regions of samples, statistical information about sample components, etc.), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein. Electronic processor 1160 can, in general, be configured through software instructions to perform any of the method steps, analysis functions, control functions, and image processing steps disclosed herein.

Other Embodiments

While examples have been provided for purposes of explanation, combinations, substitutions and alterations can be made to suit the goals, apparatus, and samples at hand, without deviating from the spirit of the disclosure, and it is intended that the scope of the disclosure be limited only by the claims appended hereto.

What is claimed is:

1. A method, comprising:
obtaining a first plurality of images of a sample, wherein each image in the first plurality of images corresponds to a different spectral band of illumination light incident on the sample or emission light from the sample;
obtaining a second plurality of images of the sample, wherein each image in the second plurality of images corresponds to a different spectral band of illumination light incident on the sample or emission light from the sample, and wherein at least one member of the second plurality of images is obtained after at least one member of the first plurality of images; and
using an electronic processor to:
spatially register the first and second pluralities of images based on information corresponding to one or more sample points from a first image from the first plurality of images and from a second image from the second plurality of images, wherein the first and second images correspond to a common spectral emission band, and wherein spatially registering the first and second pluralities of images comprises applying a transformation to at least one of the first and second pluralities of images; and combine at least some members of the first plurality of images and at least some members of the second plurality of images to form an image stack.

2. The method of claim 1, wherein each pixel in the image stack comprises spectral information derived from at least one member of the first plurality of images and spectral information derived from at least one member of the second plurality of images.

3. The method of claim 1, wherein each member of the first and second pluralities of images in the image stack corresponds to a common region of the sample.

4. The method of claim 1, wherein each pixel in the image stack comprises spectral information corresponding to at least 5 different spectral bands of illumination light incident on the sample or emission light from the sample.

5. The method of claim 1, further comprising using the electronic processor to unmix the image stack to obtain one or more component images, each of the component images comprising contributions from substantially only one component in the sample.

6. The method of claim 5, wherein one of the component images corresponds to autofluorescence from the sample.

7. The method of claim 5, wherein one of the component images corresponds to a component of the sample other than autofluorescence.

8. The method of claim 5, further comprising using the electronic processor to analyze the sample based on the one or more component images to determine locations of features within the sample.

9. The method of claim 1, wherein each member of the first and second pluralities of images corresponds to fluorescence emission from the sample.

10. The method of claim 9, wherein each member of the first plurality of images corresponds to fluorescence emission from the sample following illumination of the sample with light in a different wavelength band, and wherein each member of the second plurality of images corresponds to fluorescence emission from the sample following illumination of the sample with light in a different wavelength band.

11. The method of claim 10, further comprising using a color camera to obtain the first and second pluralities of images.

12. The method of claim 1, wherein the transformation comprises applying a Cartesian translation to at least one of the first and second pluralities of images.

13. The method of claim 1, wherein the transformation comprises rotating at least one of the first and second pluralities of images.

14. The method of claim 1, wherein the transformation comprises at least one of warping and changing a magnification of at least one of the first and second pluralities of images.

15. The method of claim 1, further comprising determining a magnitude of the transformation by performing a cross-correlation between the first and second images.

16. A system, comprising:
an illumination source configured to illuminate a sample with illumination light;
a detector configured to obtain one or more images of the sample; and
an electronic processor coupled to the detector and configured to:
obtain a first plurality of images of the sample, wherein each image in the first plurality of images corresponds to a different spectral band of illumination light incident on the sample from the illumination source or emission light from the sample;
obtain a second plurality of images of the sample, wherein each image in the second plurality of images corresponds to a different spectral band of illumination light incident on the sample from the illumination source or emission light from the sample, and wherein at least one member of the second plurality of images is obtained after at least one member of the first plurality of images;
spatially register the first and second pluralities of images based on information corresponding to one or more sample points from a first image from the first plurality of images and from a second image from the second plurality of images, wherein the first and second images correspond to a common spectral emission band, and wherein spatially registering the first and second pluralities of images comprises applying a transformation to at least one of the first and second pluralities of images; and
combine at least some members of the first plurality of images and at least some members of the second plurality of images to form an image stack.

17. The system of claim 16, wherein each pixel in the image stack comprises spectral information derived from at least one member of the first plurality of images and spectral information derived from at least one member of the second plurality of images.

18. The system of claim 16, wherein each member of the first and second pluralities of images in the image stack corresponds to a common region of the sample.

19. The system of claim 16, wherein each pixel in the image stack comprises spectral information corresponding to at least 5 different spectral bands of illumination light incident on the sample or emission light from the sample.

20. The system of claim 16, wherein the electronic processor is configured to unmix the image stack to obtain one or more component images, each of the component images comprising contributions from substantially only one component in the sample.

21. The system of claim 20, wherein one of the component images corresponds to autofluorescence from the sample.

22. The system of claim 20, wherein one of the component images corresponds to a component of the sample other than autofluorescence.

23. The system of claim 20, wherein the electronic processor is configured to analyze the sample based on the one or more component images to determine locations of features within the sample.

24. The system of claim 16, wherein each member of the first and second pluralities of images corresponds to fluorescence emission from the sample.

25. The system of claim 24, wherein each member of the first plurality of images corresponds to fluorescence emission from the sample following illumination of the sample with light in a different wavelength band, and wherein each member of the second plurality of images corresponds to fluorescence emission from the sample following illumination of the sample with light in a different wavelength band.

26. The system of claim 25, wherein the detector comprises a color camera, and wherein the electronic processor is configured to use the color camera to obtain the first and second pluralities of images.

* * * * *